Patented Sept. 30, 1952

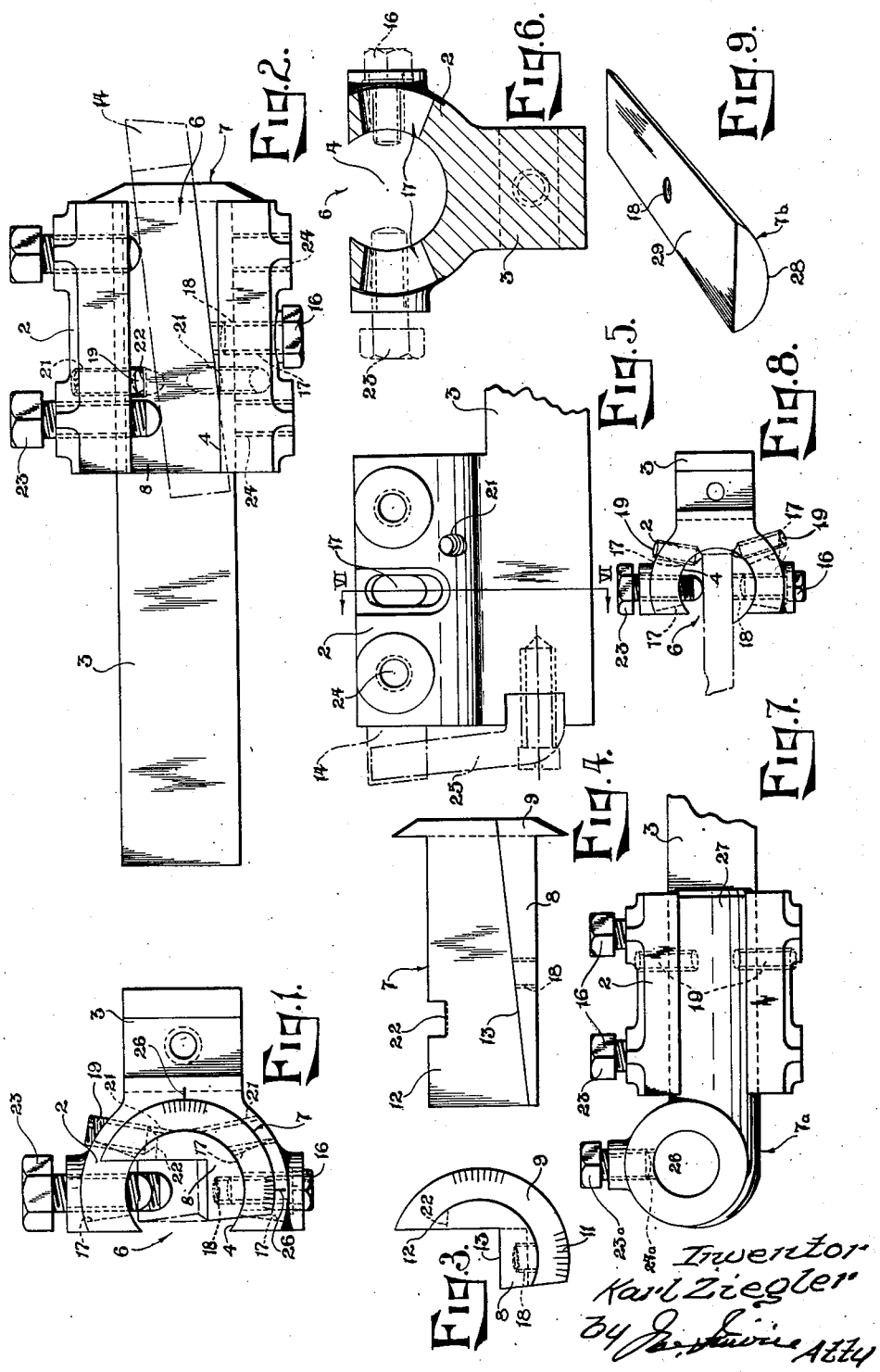

2,611,948

UNITED STATES PATENT OFFICE 2,611,948

TOOLHOLDER

Karl Ziegler, St. Kilda, Victoria, Australia

Application January 10, 1948, Serial No. 1,545
In Australia January 9, 1947

Section 1, Public Law 690, August 8, 1946
Patent expires January 9, 1967

11 Claims. (Cl. 29—98)

This invention relates to tool holders for lathes and the like.

According to previous trade practice, the only effective method of varying the rake angle of a lathe cutting tool was to remove the tool from its holder and regrind the desired angle. This is a time wasting and expensive procedure especially when cement carbide tools are involved. The latter are costly and brittle and owing to their hardness require the use of diamond dust or like wheels for carrying out the grinding operation.

The primary object of the present invention is to provide an improved tool holder for lathes or the like which enables rake and other tool angles to be readily varied in accordance with requirements without having to effect any regrinding.

The improved tool holder is of simple and inexpensive design and is capable of being readily attached to the tool posts of existing lathes. In addition to the above mentioned primary function, the improved tool holder is adapted for use with boring, forming, and a wide variety of other tools.

Various novel constructional features of the improved tool holder will be more readily apparent from the following description of several practical embodiments.

Referring to the drawings which form part of this specification:

Figure 1 is an end view of a tool holder in accordance with one embodiment of the present invention.

Figure 2 is a side elevation of Figure 1.

Figures 3 and 4 are an end view and a side elevation respectively of an adjustable tool supporting element which forms part of the improved tool holder.

Figure 5 is a fragmentary plan view of the body member of the tool holder.

Figure 6 is a cross section taken on the line VI—VI of Figure 5.

Figure 7 is a fragmentary side elevation of a modification which is adapted for use with boring bars or other tools.

Figure 8 is an end view of another modification suitable for holding boring and other types of tools in various operative positions.

Figure 9 is a perspective view of the segmental tool supporting element seen in Figure 8.

According to the embodiment illustrated in Figures 1 to 6, the improved tool holder includes a stationary body member 2 provided with a supporting bar or the like 3 for connection to the usual tool post on a lathe or the like. This bar, which is preferably formed integral with the body member, may be of square section and offset at one side of the body portion so as to extend lengthwise thereof beyond the inner end of the body member. The latter is provided with a central bore 4 which is open ended and preferably parallel sided.

The body member may be cut away at one side, for example opposite to the supporting bar 3 so as to provide an open mouth 6 which extends lengthwise of the body member and provides access to the central bore and greater clearance at that side of the tool holder.

Rotatably mounted within the body member is an adjustable tool supporting element 7. The latter includes a shank 8 which is of part cylindrical formation and adapted to form a relatively close fit within the central bore of the body portion. The shank is provided at one end with a part circular laterally extending locating flange 9 which may be provided with a tapered outer face on which a series of graduations 11 are formed.

The shank 8 is cut away at the inside remote from the curved outer surface thereof in stepped formation so as to provide two flat surfaces 12 and 13 respectively adapted to form an angular seating for the cutting tool 14 which is usually of square section. These flat surfaces are preferably disposed at right-angles to each other and one or both may be parallel to the axis of the shank.

The adjustable tool supporting element 7 usually occupies an operative position in which one of the flat surfaces such as 12 is upright. The associated flat surface which may be conveniently referred to as the inclined supporting surface 13, may be inclined downwardly and inwardly from the flange 9 to the opposite end of the shank so as to suitably tilt the axis of the cutting tool in accordance with requirements. For example each tool holder may include a set of adjustable tool supporting elements 7 in which the angle of the aforesaid lower supporting surface varies over a predetermined range such for instance as from 0° to 8° to the axis of the shank.

Associated with the foregoing is means for anchoring the adjustable tool supporting element 7 in the desired operative position in the body member. Such anchoring means may comprise one or more clamping bolts or screws 16 which pass through transverse slots 17 in the body member and enter screwed holes 18 in the shank 8.

In addition means are provided for turning the adjustable tool supporting element axially in relation to the stationary body member. Such turning means may consist of an adjusting screw or stud 19 accommodated within a screwed hole 21 in the body member and adapted to engage a recess or abutment 22 in the shank.

The square sectioned cutting tool 14 is adapted to be seated upon the aforesaid angular seating on the tool supporting element and retaining means are provided for holding the tool upon its seating. Said retaining means may consist of one or more thrust screws or bolts 23, each of which passes through a screwed hole 24 in the body member so as to engage the tool at that side opposite to the aforesaid inclined supporting surface 13. The inner end of each said thrust screw 23 is preferably of semi-spherical formation so as to permit angular adjustment of the tool supporting element to be effected when so desired.

One or more zero markings 26 is or are provided upon the end face of the body member so as to co-operate with the movable graduations 11 on the flange of the adjustable tool supporting element. As such graduations are usually closely spaced, two sets are preferably employed and arranged in appropriately spaced circumferential relationship on the flange. For example one of the sets of graduations may read 0, 5, 10, 15, 20 thousandths of an inch, whilst the associated scale may read 2, 7, 12, 17 thousandths of an inch. Thus with each of these sets associated with a separate fixed zero marking, easier reading is made possible than if a single scale with closer graduations is employed.

As seen more clearly in Figs. 5 and 6 of the drawings the operative position of the adjustable tool supporting element in the body member may be reversed in accordance with requirements. For this purpose each body member 2 may be provided with two sets of right hand and left hand tool supporting elements 7 and the body member may be provided with oppositely disposed tapped holes 24 for the thrust screws or bolts 23. In addition oppositely disposed transverse slots 17 may be provided in the body member to accommodate the anchoring bolts or screws 16.

If desired provision may be made for breaking off the helically coiled metal shortly after it leaves the cutting tool when the device is in use. For this purpose a removable chip breaker 25 may be mounted upon the outer end of the body member so as to extend laterally across the cutting tool close to the cutting edge thereof as seen in Fig. 5.

In use the cutting tool 14 may be readily placed in position upon its seating on the adjustable tool supporting element 7 and firmly secured in position by means of the thrust screws 23. Any desired circumferential adjustment of the cutting tool may be readily effected by means of the aforesaid adjusting screw 19 after which the adjustable tool supporting element may be locked in the adjusted position by means of the clamping bolts 16. Tilting of the axis of the cutting tool in accordance with requirements, is obtainable by selecting the tool supporting element which has an inclined supporting surface 13 of the most suitable angle.

According to a modification as illustrated in Fig. 7 of the drawings, the tool supporting element 7a may be of ring-like formation having an open ended central passage 26 forming a seating for the cutting tool and one or more laterally extending screwed holes 24a each of which accommodates a thrust screw 23a to retain the tool in its seating. The ring-like tool supporting element is also provided with a laterally extending shank 27 adapted for removable accommodation within the bore 4 of the body member.

According to another modification as illustrated in Figs. 8 and 9, the tool supporting element may be in the form of a bar 7b of substantially segmental shape in cross section so as to provide a curved outer surface 28 adapted to fit within the bore 4 of the body member and a substantially flat inner surface 29 forming the seating for the tool. The segmental bar may also be provided at an intermediate point in its length with one or more tapped holes 18 each of which is adapted to receive the inner end of a clamping bolt or screw 16 as aforesaid. The modifications illustrated in Figs. 7 to 9 are capable of adapting the improved device for use with boring bars, flat boring tools, drills, reamers and a variety of other tools.

In common with the embodiment illustrated in Figures 1 to 6, the constructions shown in Figures 7, 8 and 9 also include an adjusting screw or screws as aforesaid or any other suitable means for partially rotating the modified tool supporting elements within the bore of their associated body members. In all cases the adjusting screw or the like 19 also performs the additional function of serving as a limit stop for opposing undesirable movement of the cutting tool when in use.

Instead of forming the aforesaid zero marking 26 on the body member and the associated graduations on the tool supporting element as aforesaid, the relative positions of these markings may be reversed if so desired.

Various other alterations, modifications and/or additions may be incorporated in the foregoing without departing from the ambit of the invention as defined by the appended claims.

Having now described my invention, what I claim as new and desire to secure by Letters Patent is:

1. An improved tool holder for lathes and the like comprising a body member provided with means for detachably connecting it to a tool post on the lathe and having a central bore, a tool supporting element mounted longitudinally in said bore and circumferentially adjustable therein, said element having an elongated longitudinally extending tool seat to support an elongated tool longitudinally of the bore with the working end of the tool beyond the end of said bore, said seat being inclined lengthwise of said tool supporting element to tilt the axis of the tool upwardly towards its outer end and determine the top rake angle of the tool, means for partially turning the tool supporting element circumferentially within said bore to adjust the side rake angle of the tool, anchoring means for securing the tool supporting element in the desired operative position and means for retaining the tool upon its seat.

2. An improved tool holder for lathes and the like comprising a body member having a central longitudinal bore adapted to rotatably accommodate an adjustable tool supporting element of part-cylindrical form in cross section and provided with a seating for a tool so that the latter extends longthwise of both the tool supporting element and said body member, screw means for partially turning the tool supporting element and consequently the tool axially within said bore, anchoring means for securing the tool supporting element in the desired operative position, and means for retaining the tool upon its seating, said tool supporting element including a shank which is of part cylindrical formation and adapted to fit within said central bore, said shank being provided with a stepped tool seating formed by two flat faces one of which is substantially parallel with the axis of the tool supporting element whilst the other face is inclined lengthwise of said shank so as to progressively diverge from the axis thereof as it nears the inner end of the shank.

3. An improved tool holder for lathes and the like comprising a body member having a central longitudinal bore adapted to rotatably accommodate an adjustable tool supporting element of part-cylindrical form in cross section and provided with a seating for a tool so that the latter extends lengthwise of both the tool supporting element and said body member, screw means for partially turning the tool supporting element and consequently the tool axially within said bore, anchoring means for securing the tool supporting element in the desired operative position, and means for retaining the tool upon its seating, said tool supporting element including a shank which is of part cylindrical formation and adapted to fit within said central bore, said shank being provided with a stepped tool seating formed by two flat faces one of which is substantially parallel with the axis of the tool supporting element whilst the other face is inclined lengthwise of said shank so as to progressively diverge from the axis thereof as it nears the inner end of the shank, said tool supporting element being provided at one end of the shank with a part circular laterally extending locating flange provided with circumferentially spaced graduations adapted for use with one or more fixed graduations on said body member.

4. A device according to claim 8 wherein said tool supporting element includes a ring-like portion forming said tool seat and having a laterally extending shank adapted for removable connection within the bore of said body member.

5. A device according to claim 8 wherein said tool supporting element is a bar-like member of substantially chordal segment section, the segmental side of said member forming said tool seat.

6. For use in a tool holder for lathes and the like, an adjustable tool supporting element having a shank or part cylindrical formation provided at one end with a part circular laterally extending locating flange and a stepped tool seating on the inside of said shank formed by two flat faces one of which is substantially parallel with the axis of said shank whilst the other face is inclined lengthwise of the shank so as to progressively diverge from the axis thereof as it nears the inner end of the shank opposite to said locating flange.

7. An improved tool holder for lathes and the like comprising a body member provided with an offset supporting bar for removable connection to a lathe tool post, said body member having an open ended central bore which is cut away at one side to form an access opening, an adjustable tool supporting element having a shank of part cylindrical formation adapted for rotatable accommodation within said bore, the shank being cut away at the inside in stepped formation so as to provide two flat faces at substantially right angles to each other and adapted to form a seating for a cutting tool, one of the flat faces being substantially parallel to the axis of the shank whilst the other is inclined lengthwise thereof so as to progressively diverge from the axis as it nears the inner end of the shank, a part circular laterally extending locating flange at the outer end of said shank and having a series of circumferentially spaced graduations thereon adapted to co-operate with one or more fixed graduations on said body member, a turning screw or stud accommodated within a screwed hole in the body member and adapted to engage an abutment on said shank, one or more clamping bolts or screws each of which is connected at its inner end to said shank and passes through a transverse slot in said body member and one or more thrust screws or bolts each of which passes through a screwed hole in the body member so as to engage the tool opposite to the inclined supporting face of said seating.

8. An improved tool holder for lathes and the like comprising a body member having a bore, a tool supporting element of part-cylindrical form in cross section mounted in said bore and rotatably adjustable therein, said element having an elongated seat for an elongated tool and which extends lengthwise of the tool supporting element to support the tool longitudinally in the bore with the working end of the tool extending beyond the end of the bore, means for partially turning the tool supporting element and consequently the tool circumferentially within said bore, anchoring means for securing the tool supporting element in the desired operative position and means for retaining the tool upon its seat.

9. A tool holder as defined in claim 8 wherein said body member is cut away to said bore along one side to provide a mouth opening laterally into said bore and enabling the removable fitting of tools laterally through said mouth onto said seat.

10. A tool holder as defined in claim 8 wherein anchoring means comprises at least one clamping screw extending through said body member and threaded at its inner end to said tool supporting element, said body member having a transverse slot through which said clamping screw extends, whereby to accommodate circumferential movement of said element in said bore to angularly adjust said tool seat.

11. A tool holder as defined in claim 8 wherein said turning means comprises an abutment in the cylindrical portion of said tool supporting element, said body member having an internally threaded hole opening into said bore substantially tangentially thereof, and an adjusting screw threaded in said hole and engaging said abutment for selectively moving said element circumferentially in said bore to adjust the side rake angle of the tool.

KARL ZIEGLER.

REFERENCES CITED

The following references are of record in the file of this patent:

UNITED STATES PATENTS

| Number | Name | Date |
|---|---|---|
| 641,241 | Sherwood | Jan. 9, 1900 |
| 745,576 | Darling | Dec. 1, 1903 |
| 1,014,412 | Palmgren | Jan. 9, 1912 |
| 1,050,701 | Shouldice | Jan. 14, 1913 |
| 1,482,916 | Dugar | Feb. 5, 1924 |
| 2,347,136 | Speckert | Apr. 18, 1944 |

FOREIGN PATENTS

| Number | Country | Date |
|---|---|---|
| 62,214 | Norway | Mar. 18, 1940 |